(12) United States Patent
Hitchcock et al.

(10) Patent No.: US 6,243,833 B1
(45) Date of Patent: Jun. 5, 2001

(54) APPARATUS AND METHOD FOR SELF GENERATING ERROR SIMULATION TEST DATA FROM PRODUCTION CODE

(75) Inventors: Glenn Daniel Hitchcock, Orlando, FL (US); Lee Patrick Prissel, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/140,048

(22) Filed: Aug. 26, 1998

(51) Int. Cl.[7] .................................................. G06F 11/00
(52) U.S. Cl. ............................................... 714/33; 709/300
(58) Field of Search ................................ 714/33, 38, 42, 714/7, 8, 25, 26, 32; 709/300–303

(56) References Cited

U.S. PATENT DOCUMENTS

| | | | |
|---|---|---|---|
| 5,379,414 | * | 1/1995 | Adams ................................... 395/575 |
| 5,557,740 | * | 9/1996 | Johnson et al. .................. 395/183.14 |
| 5,630,049 | * | 5/1997 | Cardoza et al. ................. 395/183.01 |
| 5,687,376 | * | 11/1997 | Celi, Jr. et al. ....................... 395/704 |
| 5,774,640 | * | 6/1998 | Kurio ............................... 395/182.02 |
| 5,867,710 | * | 2/1999 | Dorris et al. .......................... 395/704 |
| 5,910,180 | * | 6/1999 | Flory et al. ............................ 709/301 |
| 5,983,366 | * | 11/1999 | King ........................................ 714/38 |
| 6,009,476 | * | 12/1999 | Flory et al. ............................ 709/301 |

\* cited by examiner

*Primary Examiner*—Nadeem Iqbal
(74) *Attorney, Agent, or Firm*—Schmeiser, Olsen & Watts (57) ABSTRACT

A method and apparatus for automatically testing device drivers is disclosed. The invention is applicable to any system wherein software or a device driver receives primitive errors from a device and reports high level errors to a client. The invention generates error test data from tables in the software and creates a test data table. The invention then uses the test data table to simulate primitive errors in the device through hardware or software means. Finally, the invention ensures that the client has received the correct error messages from the software or device driver.

19 Claims, 5 Drawing Sheets

| Type of Simulation | Type of Simulation Data | Error Count | Key | ascAscq | Alias to High Level Error | |
|---|---|---|---|---|---|---|
| errSim | scsiSenseStandard | 01 | 04 | 0000 | 00 | A |
| errSim | scsiSenseStandard | 07 | 04 | 0000 | 25 | B |
| errSim | scsiSenseStandard | 01 | 03 | 1100 | 06 | C |
| errSim | scsiSenseStandard | 07 | 03 | 1100 | 27 | D |
| 310 | 320 | 330 | 340 | 350 | 360 | |

APPARATUS AND METHOD FOR SELF GENERATING ERROR SIMULATION TEST DATA FROM PRODUCTION CODE

BACKGROUND OF THE INVENTION

1. Technical Field

This invention generally relates to computer system drivers. More specifically, this invention relates to generating test data for computer system drivers.

2. Background Art

The development of the EDVAC computer system of 1948 is often cited as the beginning of the computer era. Since that time, computer systems have evolved into extremely sophisticated devices, and computer systems may be found in many different settings. Modern computer systems vary in their design and architecture, with many different models available to achieve the desired combination of speed, power and efficiency for any given computing environment.

Computer systems typically include operating system software that controls the basic functions of the computer, and one or more software applications that run under the control of the operating system to perform desired tasks. For example, a typical IBM Personal Computer may run the OS/2 operating system, and under the control of the OS/2 operating system, a user may execute an application program, such as a word processor. As the capabilities of computer systems have increased, the software applications designed for high performance computer systems have become extremely powerful.

One example of a specific area of computer-related technology that has become increasingly more complex over the years is the use and application of "device drivers." Drivers are typically small, dedicated software routines that act as intermediaries between the operating system and/or an application and a piece of hardware. For instance, when a user wishes to print a document, the word processing program must communicate with the printer driver in order to access the printer. The printer driver knows how to control the printer to accurately reproduce the document being printed from the word processing program. Other software programs that need to provide printed output would also access the printer via the printer driver. Similarly, other driver programs are written to control other types of computer-related peripheral devices such as CD-ROM drives, scanners, etc. Since drivers are typically adapted to function with a given combination of software and hardware, new drivers are commonly loaded into a system whenever a new software program or hardware peripheral is added to a computer system.

One reason that drivers have been increasing in complexity is because computer hardware has been increasing in complexity. There are many different types of hardware available today that were not readily available only a few short years ago. This includes devices such as DVD disk drives, TV adapter cards, and other similar devices. Each device driver is generally tailored to a specific hardware product and, in some cases, a specific configuration of a given hardware product. Minor changes in hardware will often necessitate changes in the corresponding device drivers. As with other software programs, these driver updates or modifications are termed "revisions." New features added to existing hardware components may also cause minor driver revisions. In fact, if there are major revisions to hardware, the device drivers associated with the newly revised hardware may have to be completely rewritten.

Not only are new device drivers increasing complex, existing drivers are also being modified on a more frequent schedule today. These modifications to the drivers tend to be smaller than the wholesale changes needed when a new version of hardware is introduced. Drivers occasionally need to be "updated" or partially rewritten if a "bug" is discovered in the operation of the driver. "Bugs" are programming errors in the device driver software which cause the driver to function incorrectly. Because of the increased complexity of drivers, eliminating one bug in a device driver may introduce another bug, which will then necessitate yet another change to the driver software. In addition, operating systems are always adding new functionality to the system, sometimes affecting the interaction and operation of device drivers.

These frequent changes to device drivers, for whatever reason, carry a concomitant requirement that drivers be tested very frequently. Whenever a change is implemented for a given device driver, the driver should be tested to ensure that the driver performs as it is intended to perform. Driver testing is usually performed by having a driver tester, as part of a test group, write an error and/or a diagnostic test case for every error or diagnostic test to which the driver can respond. The error test cases ensure that a driver can respond correctly to any possible error. Diagnostic test cases ensure that the hardware is functioning in accordance with the expectations for the device driver. Once again, as the driver software is updated to reflect new capabilities or new hardware, the diagnostic test cases for the driver software must also be updated to reflect and test the changes. Small changes in the driver software may require only small changes to be made from the previous versions of the test cases. However, significant changes in the driver software (such as when new hardware is developed or a driver for a new operating system is written) can cause large changes in the test cases, or, in comes cases, may force the developers to completely rewrite the diagnostic test cases for the new drivers.

The constant revision of the diagnostic test software and related testing of device drivers is extremely time consuming, even when small changes to the device driver are being made. Driver testers must compare the new driver's error and diagnostic test cases versus the old driver's error and diagnostic test cases. This process, which is performed manually, can be extremely laborious because there can be hundreds of different errors, and searching through the entire list just to delete one error and/or add another error is a lengthy endeavor. In addition, once the test cases have been generated for the new driver, the driver tester must then actually test the driver. This is also a lengthy process because the driver tester must simulate each error and verify that the device driver actually detects the error and responds to the error in the desired way.

In addition, the process of creating test and diagnostic cases for device drivers is, in itself, prone to the introduction of errors. The person writing the device driver software must be aware of the many different errors and the available diagnostic tests that the driver can support. These different errors and diagnostic tests must be transcribed and given to the driver tester. The driver tester then needs to use these errors and diagnostic tests to generate the error test cases and the diagnostic test cases, respectively. At each stage in this process, there is room for error. For instance, the person writing the driver may not transcribe the errors correctly, and this transcription mistake will end up in the final test and diagnostic cases.

Without an easier and more error-free way of generating error and diagnostic test cases for drivers and subsequently testing the drivers, software drivers will, of necessity, continue to be tested in a tedious, laborious, and error-prone manner. With the continued rapid introduction of new hardware products and the on-going introduction of new features for existing products, current driver testing procedures will be increasingly inadequate as time goes on.

DISCLOSURE OF INVENTION

The preferred embodiments of the present invention provide an apparatus and method for automatically generating error and diagnostic testing data from a device driver to be used in the error testing process. After generation, these test data are then used as input to a single generic test case that simulates the primitive errors for a given device driver and compares the expected result with the actual result.

In addition, the most preferred embodiments of the present invention generate the necessary test data using production driver code tables and/or driver maps containing primitive errors and the associated client responses. After generation, this test data is then interpreted by the generic error simulation test case that parses and interprets the test data, using the generated test data to subsequently build and execute simulation requests to actually test the device driver. Finally, the various preferred embodiments of the present invention maintain a copy of the device driver software that maps a series of error aliases to the expected client response data for each error. This ensures that any production driver software problems, related to the process of mapping an error alias to the associated client response data, will be detected during error simulation.

BRIEF DESCRIPTION OF DRAWINGS

The preferred exemplary embodiments of the present invention will hereinafter be described in conjunction with the appended drawings, where like designations denote like elements, and.

BEST MODE FOR CARRYING OUT THE INVENTION

The present invention relates to computer system and device drivers. For those individuals who are not generally familiar with computer system drivers, the Overview section below presents many of the basic concepts and terminology that will help to understand the invention. Individuals skilled in the art of computer system drivers may wish to skip this overview and proceed directly to the Detailed Description section of this specification.

1. Overview

System drivers are software programs that interface a computer system and its operating system with a device in the computer system or peripheral device attached to the computer system. In the course of working with the device, the operating system will send commands through a system driver (also known as a device driver) to the device. The device also communicates back to the operating system with errors or other information. Such errors generally consist of messages such as "Out of paper" (for a printer), "Error reading from a platter in the hard disk" (for a hard disk drive), or "The input buffer has overrun" (for a modem). These error conditions are necessary so that the operating system can perform other actions and/or alert the user to the problem, leading to appropriate resolution.

The hardware designer knows the various errors that may occur during operation of the hardware device and the designer can then build routines to handle these errors into the device driver. For instance, the hardware designer who is designing a printer obviously knows that the printer may run out of paper, and the designer will add this error to the list of possible errors and prepare an appropriate response for the device driver to communicate in the eventuality that the printer runs out of paper. The error messages or error types that are supported by a device may also be contained in an industry-defined protocol or standard. For instance, the small computer system interface (SCSI) standard defines many different commands and error messages that SCSI devices must support in order to comply with the published standard. The hardware designer, in this instance, then must support these commands and error messages to ensure successful operation in accordance with the desired standard. The various possible errors that may be generated by a device are known as "architected" errors. Each device will have a set of architected errors associated with it, and the device driver should be aware of each possible error.

Drivers may also interact directly with application programs in addition to interacting with operating systems. For purposes of this specification, and from the perspective of the device driver, both application programs and operating systems will be referred to as "clients." The device driver, during performance of its intended functions, will communicate with a client or clients. There are some errors that a device may generate that the driver may not need to communicate to the client. For instance, if a disk drive has an error-correcting coding functionality, and the device detects an error but corrects the error through error correcting codes, the driver associated with the disk drive may not report this error to the client. Thus, only some subset of all possible architected primitive errors will be mapped to a client error response, but all architected primitive errors must be reported by the device when or if they occur. In addition, it is possible that several different primitive errors may be mapped to the same client error. For example, there may be several different primitive errors associated with a hard disk drive's inability to read data from a platter; however, the driver may just send an "Error reading from the disk" message to client for each of these errors.

As software products, device drivers may be designed in many different ways. One typical design uses a table or a map of low-level, primitive errors, with each primitive error being linked to set of recovery action parameters. The recovery action parameters are the parameters needed to recover from the error. These will be discussed in more detail below. The reasons that this tabular design is attractive for driver design are threefold. First, this design allows a direct mapping between the error and the action that the device needs to take to recover from the action. This makes it easier for the driver designer to check the table to ensure that all potential errors are in the table. This direct mapping also makes the device driver designer's job easier if the device driver designer is using a standard—the device driver designer can simply compare the standard versus the map or table. Second, by having this information in a table, if the driver developer forgets to add an error or assigns a wrong recovery action to the error, it is relatively simple to change, add, or delete errors. Finally, if portions of the device driver need to be rewritten, it is much easier to update and change tables than it is to update, change, add, or delete "hard coded" errors and recovery actions.

If a device driver adopts the tabular method of mapping primitive errors to error recovery methods, there may be several different tables with multiple classification of primitive types in the driver. In particular, SCSI device drivers will generally have one table for SCSI sense keys, where the sense keys are related to one type of primitive errors, and another table for status bytes, where the status bytes are related to a second type of primitive errors.

To conclude, an operating system or application, known as a client, interacts with a device driver. The device driver must support all architected primitive errors associated with its hardware and will communicate some of these errors to the client, as necessary. Error tables or maps are a commonly-implemented, relatively suitable design for device drivers because they are extensible, easy-to-change, and easy-to-update.

2. Detailed Description

The preferred embodiments of the present invention overcome many of the disadvantages of the previous laborious device driver testing procedures by automating device driver testing. The preferred embodiments interact with device drivers that employ an enhanced version of tabulated (or mapped) primitive errors to produce test data. Once the test data is generated, the preferred embodiments of the present invention use this extracted test data to generate actual tests or test cases that can be used by the testing mechanism of the preferred embodiments to actually test a device. Thus, the preferred embodiments can test a device by using the tables in the device driver itself. This obviates the need for having testing groups continuously writing new tests for new or slightly changed drivers.

In addition, many of the errors introduced through the prior art method of creating test and diagnostic cases for drivers have been eliminated because the preferred embodiment creates the test and diagnostic cases from the actual tables contained in the device driver. There is no transcription involved. Furthermore, even if the device driver's tabular data is incorrect, a preferred embodiment of the present invention will keep its own copy of the software or code that maps an alias (to be described below) to the expected client response data. As such, errors in the production device driver's tables should be substantially reduced or eliminated.

Figure 1:
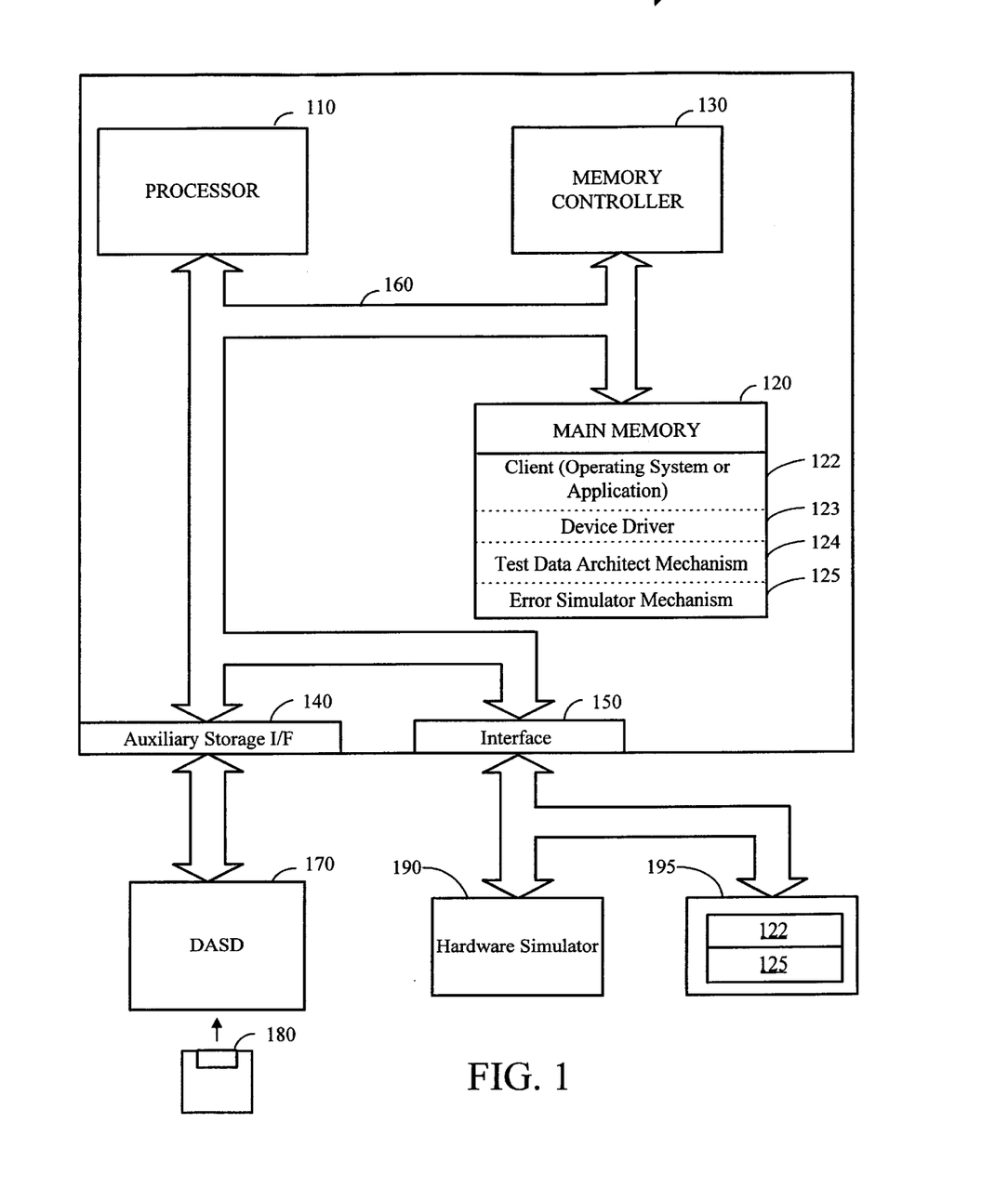
FIG. 1 is a block diagram of a computer system in accordance with a preferred embodiment of the present invention.

Referring now to FIG. 1, a computer system 100 in accordance with a preferred embodiment of the present invention is a computer system using system or device drivers. Those skilled in the art will appreciate that the methods and apparatus of the present invention apply equally to any computer system, regardless of whether the computer system is a complicated multi-user computing apparatus, a single user device such as a personal computer or workstation, a portable computer system or hand-held device, a television set-top box running an operating system, or any system using system or device drivers. Computer system 100 suitably comprises a processor 110, main memory 120, a memory controller 130, an auxiliary storage interface 140, and an interface 150, all of which are interconnected via a system bus 160. Note that various modifications, additions, or deletions may be made to computer system 100 illustrated in FIG. 1 within the scope of the present invention such as the addition of cache memory or other peripheral devices. FIG. 1 is presented to simply illustrate some of the salient features of computer system 100. Also shown in FIG. 1 are a direct access storage device (DASD) 170, a disk 180, a hardware simulator 190, and a second computer system 195. These various components are explained in more detail below.

Processor 110 performs the various computation and control functions of computer system 100, and will typically comprise at least one suitable central processing unit. Processor 110 may comprise a single integrated circuit, such as a microprocessor, or may comprise any suitable number of integrated circuit devices and/or circuit boards working in cooperation to accomplish the functions of a processor. Processor 110 suitably executes a client 122 within main memory 120. Client 122 may be an operating system and/or an application that needs to interact with device driver 123. Device driver 123 is any system or device driver that acts to control a device and interact with client 122. Device driver 123 may also include virtual device drivers. An example of a virtual device and virtual device drivers is the virtual file allocation table (VFAT) and its device drivers. A file allocation table (FAT) may be contained in a table on a hard drive such as the one represented by DASD 170. The FAT describes how spaces on the hard drive are allocated to files. The VFAT does the same thing, only it is "virtual" inasmuch as it is only a series of memory locations. The VFAT, which is stored in main memory 120, is a copy of the FAT. The VFAT, in conjunction with various drivers, periodically updates the FAT. The operating system, through virtual device drivers, then updates the VFAT.

Figure 2:
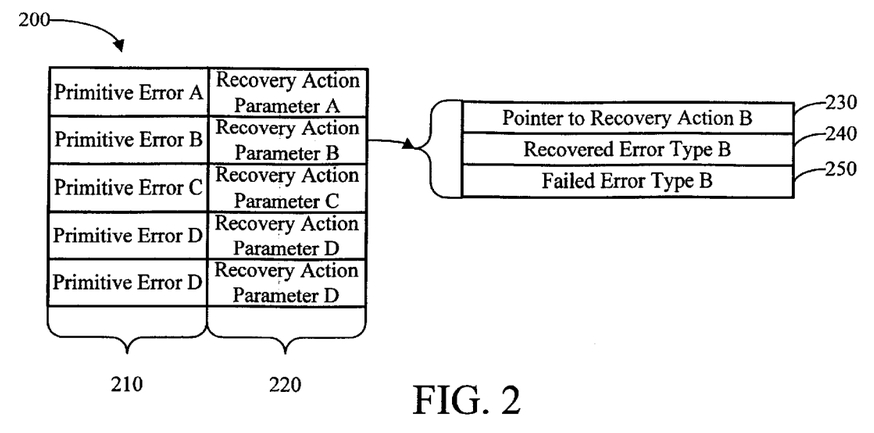
FIG. 2 shows a portion of a device driver error table in accordance with a preferred embodiment of the present invention.

Device driver 123 will also have error tables (not shown in FIG. 1) as described in the Overview section and as will be more particularly described in reference to FIG. 2. These error tables may be an integral part of device driver 123, or they may be stored separately from device driver 123, such as being stored in main memory 120 or being stored on DASD 170.

As shown in FIG. 1, in addition to client 122 and device driver 123, memory 120 will also contain test data architect mechanism 124 and error simulator mechanism 125. Test data architect mechanism 124 and error simulator mechanism 125 are computer-implemented and enabled software mechanisms that perform various functions associated with testing driver 123. Test data architect mechanism 124 interacts with the error tables associated with device driver 123 to produce test data (also not shown in FIG. 1). Error simulator mechanism 125 is a client program above the device driver level that uses this test data to simulate errors and to check the functionality of device driver 123 once an error has been simulated. If device driver 123 does not perform the correct actions once the error has been simulated, error simulator mechanism 125 will inform the user of error simulator mechanism 125 that an incorrect error recovery was performed by device driver 123. Similarly, if an error is completely ignored by device driver 123, error simulator mechanism 125 will also inform the user of error simulator mechanism 125 that device driver 123 is not operating in accordance with the specifications. These concepts will be discussed in more detail below.

Interface 150 acts a link between computer system 100 and other computer systems or peripheral devices. Connected to interface 150 could be a parallel port, serial port, modem, network, or a SCSI interface and bus. In particular, as shown in FIG. 1, second computer system 195 running client 122 and error simulator mechanism 125 is depicted (the rest of the elements in computer system 195 are not shown). This illustrates that, in a preferred embodiment of the present invention, error simulator mechanism 125 and test data architect mechanism 124 are separate entities such that error simulator mechanism 125 may be implemented on a different computer system that may also be using a different operating system than operating system 122.

FIG. 1 also illustrates that error simulator mechanism 125 can interface with and control hardware simulator 190, if necessary. Some device drivers 123 support testing primitive errors through software. If a device driver 123 supports software testing, error simulator mechanism 125 need only send a command to device driver 123 to simulate the error. However, some device drivers 123 either do not support the testing of errors through software or do not provide software testing support for particular primitive errors. In this case, error simulator mechanism 125 will generally communicate with hardware simulator 190 to create the primitive error. Test data architect mechanism 124 should know which primitive errors need hardware simulation and which primitive errors need software simulation. Test data architect mechanism 124 will design the test data such that error simulator mechanism 125, reading the tabular test data, will know if a primitive error need to have its error simulated in hardware, and error simulator mechanism 125 will be designed to communicate over system bus 160 and through interface 150 with hardware simulator 190 to simulate the primitive error.

Auxiliary storage interface 140 allows computer system 100 to store and retrieve information from auxiliary storage devices, such as magnetic disk (e.g., hard disks or floppy diskettes) or optical storage devices (e.g., CD-ROM). One suitable storage device is a DASD 170. As shown in FIG. 1, DASD 170 may be a floppy disk drive which may read programs and data from a floppy disk 180.

It is important to note that while the present invention has been (and will continue to be) described in the context of a fully functional computer system, those skilled in the art will appreciate that the mechanisms of the present invention are capable of being distributed as a program product in a variety of forms, and that the present invention applies equally regardless of the particular type of signal bearing media to actually carry out the distribution. Examples of signal bearing media include: recordable type media such as floppy disks (e.g., disk 180) and CD-ROMs, and transmission type media such as digital and analog communication links, including wireless communication links.

Memory controller 130 is responsible for providing control signals to move, store, and retrieve requested data from main memory 120 and/or through auxiliary storage interface 140 for use by processor 110. While for the purposes of explanation, memory controller 130 is shown as a separate entity, those skilled in the art understand that, in practice, portions of the function provided by memory controller 130 may actually reside in the circuitry associated with processor 110, main memory 120, and/or auxiliary storage interface 140.

Referring now to FIG. 2, a small portion of a driver error table 200 is shown. In general, each device driver 123 will have at least one error table 200 associated with it. Device driver 123 uses error table 200 to map primitive errors 210A, 210B, 210C, and 210D to recovery action parameters 220A, 220B, 220C and 220D. As previously mentioned, error table 200 can be maintained in many different locations. For example, error table 200 may be incorporated as part of device driver 123, stored in main memory 120, or stored on DASD 170. Error table 200 can be maintained in any suitable storage location which can be accessed by device driver 123 and which can be used to store information. Naturally, a complete error table will be much larger than the portion of error table 200 as shown in FIG. 2. However, the sample portion of error table 200 shown in FIG. 2 will suffice to illustrate the important aspects of implementing and using error table 200 for the various preferred embodiments of the present invention. In addition, as discussed previously, device driver 123 may have multiple error tables 200. Primitive errors 210 are low level errors that device driver 123 must support and handle. Device driver 123 recognizes primitive errors 210 and performs the actions required by recovery action parameters 220. There is a one-to-one mapping between primitive errors 210 and recovery action parameters 220, e.g.—primitive error 210A maps to recovery action parameter 220A, primitive error 210B maps to recovery action parameter 220B, etc.

Recovery action parameters 220 are actually several actions and/or codes that inform device driver 123 what actions device driver 123 is to perform to recover from primitive error 210. These actions are shown in FIG. 2. Recovery action parameter 220B comprises a pointer to recovery action 230B, recovered error type 240B, and failed error type 250B. Similarly, although not shown in FIG. 2, recovery action parameter 220A would have a pointer to recovery action 230A, recovered error type 240A, and failed error type 250A. The pointer to recovery action 230 is a pointer that points to a section of main memory 120 or device driver 123 that tells device driver 123 what specific actions to take when an error is identified, i.e., how to recover from primitive error 210. Each recovery action parameter 220 may also store a pointer to another table containing pointers to recovery action 230, recovered error type 240, and failed error type 250, or each recovery action parameter 220 could actually contain a pointer to recovery action 230, recovered error type 240, and failed error type 250. Any suitable method known to those in the art that allows primitive error 210 to be linked with a set of recovery actions such as recovery actions 220 may be used in accordance with the preferred embodiments of the present invention. Recovered error type 240 is used when device driver 123 encounters an error that device driver 123 can recover from, while failed error type 250 represents an error which device driver 123 cannot recover from.

Previous methods of testing device drivers 123 generally involved writing software that would create primitive error 210. This software would have to create each and every primitive error 210. Each primitive error 210, then, would have its own "test case" for that particular error. The particular device driver 123 being tested would subsequently have to run each test case and ensure that recovery action parameters 220 (and their associated pointers to recover action 230) were correctly performed by device driver 123. The driver tester would repeat this process for each and every test case, which could be very laborious if there were many test cases, as is typical.

Recovered error type 240 and failed error type 250 are part of the preferred embodiments of the present invention. Test data architect mechanism 124 uses these two error types to produce test data. Recovered error type 240 and failed error type 250 are "high level" responses provided to the client. These two error types are called high level because they respond to the high level client that would receive these error messages. These error types may also be different than low level primitive error 210. For instance, if primitive error 210 is a "parity error" on the SCSI bus, recovered error type 240 and failed error type 250 might both be "SCSI bus problem." In general, the client error or response will be a broader or more generalized statement of the error because the client will be describing the errors to a user, and the user will generally only need to know that there is a problem, not what the exact problem is.

Different clients may require different formatted responses from a given device driver for the same error. For instance, one client might require a four-byte response and a special error message to indicate that a given failed error has occurred, while another client might require a ten-byte response and no special error message to report that the same failed error has occurred. Thus, recovered error type 240 and failed error type 250 will generally change with different clients and will be mapped to a different set of response data for different clients.

Recovered error type 240 maps to several responses that may be sent to client 122 from device driver 123, indicating that device driver 123 encountered a particular error but was able to recover from the error. Thus, client 122 may choose not to respond to recovered error type 240. Client 122 will know the specific type of error that device driver 123 encountered because recovered error type 240 contains the type of error that is sent as one response, or is mapped to one of the responses to client 122. Failed error type 250 is a more significant error because this type of error indicates that device driver 123 could not complete a task because of failed error type 250. Again, device driver 123 communicates this message or its associated responses to client 122, and client 122 must address the error. Client 122 will know what type of error was encountered because failed error type 250 also reports error responses to client 122.

Thus, both failed error type 250 and recovered error type 240 are data that identify what error response should be sent to the client and that also map the type of error to one or more responses that are sent to client 122. Test data architect mechanism 124 uses these error types to create test data. Test data architect mechanism 124, then, will create test data for each and every primitive error 210 contained in any and all error table 200 associated with a given device driver 123.

Figure 2A:
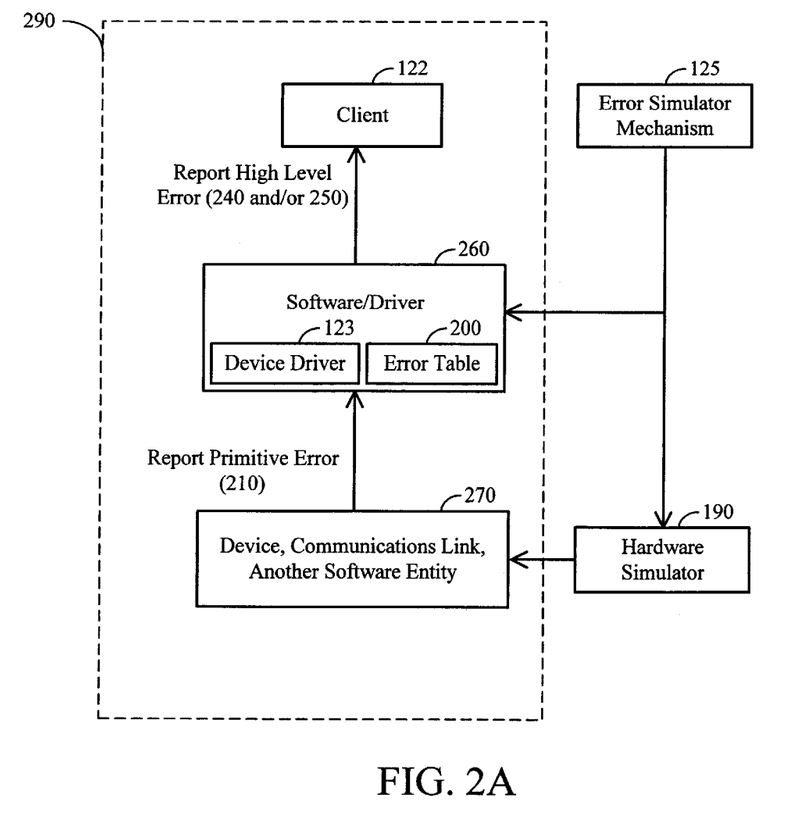
FIG. 2A is a block diagram a software-related view of a preferred embodiment of the present invention.

Referring now to FIG. 2A, the interrelationship between several elements of the preferred embodiments of the present invention is diagramed. In general, the preferred embodiments of the present invention are applicable to any apparatus with the structure 290. Structure 290 includes a mechanism 270 which can be a low-level device, communications link, or another software entity. Mechanism 270 reports primitive error 210 to a medium-level software/ driver 260, which then uses primitive error 210 to send the details of the error, in the form of responses or high level errors, recovered error type 240, or failed error type 250, to the highest level, i.e., client 122. Software/driver 260 typically encompasses device driver 123 and an error table 200. As shown in FIG. 2A, software/driver 260 may be implemented as a piece of software. Any apparatus with structure 290 can incorporate the preferred embodiments of the present invention.

FIG. 2A also shows that error simulator mechanism 125 is at the same logical level as client 122. In fact, in the most preferred embodiments of the present invention, error simulator mechanism 125 will replace client 122 when error simulator mechanism 125 is testing device driver 123 or software/driver 260. Error simulator mechanism 125 can simulate primitive error 210 by using either hardware or software. If the device driver 123 supports some type of error application programmer interface (API), so that error simulator mechanism 125 can use the API to tell device driver 123 to create an error, the error simulator mechanism 125 communicates directly with the device driver 123 as shown in FIG. 2A. If device driver 123 does not support the API or only supports the API only for some errors, hardware simulator 190 can be used by error simulator mechanism 125 to simulate the primitive error 210. FIG. 2A shows hardware simulator 190 communicating with device, communications link, or another software entity 270. It is also possible that hardware simulator 190 could take the place of device, communications link, or another software entity 270 instead of merely communicating with it.

Figure 3:
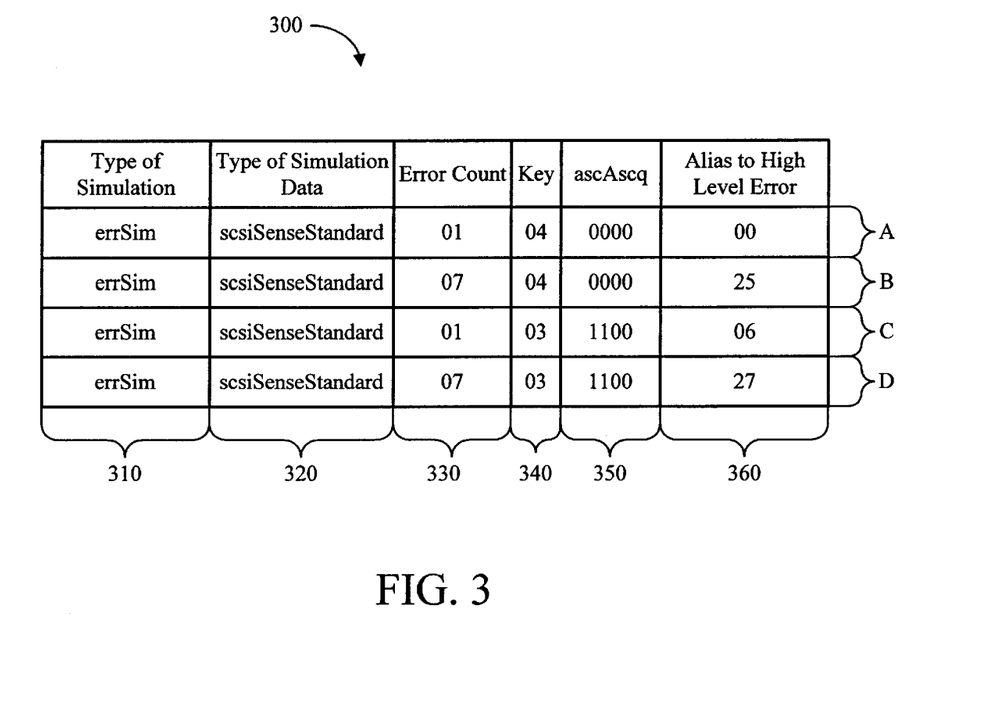
FIG. 3 is a representation of a portion of a data table created by a test data architect mechanism in accordance with a preferred embodiment of the present invention.

Referring now to FIG. 3, a portion of a data table 300, which was generated by test data architect mechanism 124 for a SCSI peripheral, is illustrated. As with error table 200 shown in FIG. 2, a complete data table 300 in a real application will contain significantly larger amounts of data than what is shown in FIG. 3. Once again, those skilled in the art will be able to readily adapt the concepts illustrated in FIG. 3 to a more realistic scale. The portion of data table 300 shown in FIG. 3 is sufficient to describe and illustrate the concepts associated with the creation and use of such a data table. Data table 300 comprises a type of simulation 310, a type of simulation data 320, an error count 330, a key 330, SCSI error ascAscq 350, and an alias to high level error 360. These various entities have been divided into rows A, B, C, and D to ease description of the entries.

In general, each primitive error 210 will have at least one entry (row) in data table 300, and each entry will generally contain, at a minimum, the two entries corresponding to recovered error type 240 and failed error type 250. It should be noted that data table 300 is generated by when test data architect mechanism 124 parses through error table 200 to extract much of the information in data table 300. In addition, data table 300 will be used by error simulator mechanism 125 to actually simulate primitive error 210 during the testing of device driver 123. Thus, some of the entries that are in data table 300 are derived from error table 200 and some of the entries are placed in data table 300 by test data architect mechanism 124 to enable or help error simulator mechanism 125 to adequately test device driver 123.

The entries that are derived from error table 200 after test data architect mechanism 124 parses error table 200 are key 340, ascAscq 350, and alias to high level error 360. Key 340 and ascAscq 350 are particular errors that the SCSI specification defines and that device driver 123 should support. Primitive error 210A, then, could correspond to keys 340A and 340B and ascAscq 350A and 350B. Similarly, primitive error 210B then would correspond to keys 340C and 350D and ascAscq 350C and 350D. Thus in the preferred embodiment, there are two entries in data table 300 for each primitive error 210.

In a preferred embodiment, error count 330 corresponds to whether the error is a recovered error type 240 or a failed error type 250. If the error is a recovered error type 240, the number in error count 330 is a one (e.g., "01"); if the error is a failed error type 250, the number in error count 330 is a seven (e.g., "07"). The particular number in error count 330 is chosen because this particular SCSI peripheral is set to automatically retry when it receives the error defined by key 330 and ascAscq 350. Therefore, an error count 330 of one should mean that device driver 123 will handle the error and be able to recover from it. An error count 330 of seven will mean that device driver 123 will continually get the error until device driver 123 "gives up" trying to fix the error. Device driver 123 will then indicate that a hard, or non-recoverable error, has occurred. Thus, the value in error count 300 should be greater than the amount of retries, at which the peripheral is set, above which the peripheral will indicate that a hard, non-recoverable error has occurred.

It is important to note that test data architect mechanism 124 places the values in error count 330 based on whether the error to be simulated is a recoverable error or a hard error. Thus, error count 330 is indirectly extracted from error table 200.

The last data element of data table 300, which is extracted directly from error table 200 by test data architect mechanism 124, is the alias to high level error 360. Alias to high level error 360 is an alias to a high level error. Each alias will correlate with either a recovered error type 240 or a failed error type 250. For instance, alias to high level error 360A corresponds to recovered error type 240A and alias to high level error 360B corresponds to failed error type 250A. Recovered error type 240 and failed error type 240 will each generally have several responses to the client to inform the client of the nature of a particular primitive error 210 that has occurred. The exact number and format of the responses are determined by the client. Alias to high level error 360 is one alias that maps all of these responses into the alias to high level error 360. This system of mapping the responses into alias to high level error 360 is preferred because this system makes it very easy, when creating data table 300 for different clients, to change the alias instead of changing several responses and the structure of tables 200 (specifically 240 and 250) and 300 (specifically 360). In addition, primitive error 210 generally will not change from client to client. For instance, a SCSI parity error is still a SCSI parity error regardless of the client. It is possible however, that the responses to the client concerning this error will change if clients change.

In a preferred embodiment of the invention, alias to high level error 360 is an index into a table of high level errors. Thus, the "00" listed as alias to high level error 360A is the high level error at location zero (the zero element is the first element in an array in the C, C++, JAVA, etc. programming languages). The "25" listed as alias to high level error 360B is the high level error 25 (the 26th element in an array) in the table of high level errors. The reason, as stated previously, that the preferred embodiment uses such a table is that there may be more than one parameter to the high level error and it is easier to put multiple parameters in one full error than it is to add the parameters to data table 300. For instance, a parity error may need the parameters "parity error," "SCSI bus," and "recovered" for the main error to be "The SCSI bus had a parity error but was able to recover." It is simpler to use just the statement "The SCSI bus had a parity error but was able to recover" than it is to add all three parameters and use the three parameters to generate the complete error statement.

Test data architect mechanism 124 uses table 200 to retrieve an alias to high level error 360 and to place this alias in data table 300. The table of high level errors (aliases), then, is used to map high level error 360 to the responses sent by device driver 123 to the client 122. The responses, again, are the client-specific response data associated with entries 240 or 250. Similarly, error simulator mechanism 125, could also use table 200 to perform the opposite type of data retrieval. Error simulator mechanism 125 would use the alias 360 to find the client response associated with that alias.

In an alternative preferred embodiment of the invention, the alias to high level error 360 is used as an identifier that tells an error program the client error details and responses to build. Error simulator mechanism 125 then passes the alias to this error program, the error program builds the errors and responses and passes these back to error simulator mechanism 125. Error simulator mechanism 125 can then use this information to compare against the actual client response information returned by device driver 123.

What is important for the preferred embodiments of the present invention is that error simulator mechanism 125 be able to convert each alias to high level error 360 to the expected client response data associated with entries 240 or 250. Note that another alternative preferred embodiment of the invention does not have alias to high level error 360; instead, recovered error type 240 and failed error type 250 (and generally all associated responses) are placed into data table 300.

The two parts of data table 300 that are not obtained, either directly or indirectly, by test data architect mechanism 124 when test data architect mechanism 124 parses through error table 200 are type of simulation 310 and type of simulation data 320. These two fields are generated by test data architect mechanism 124, and the fields act as guides to error simulator mechanism 125. Error simulator mechanism 125 reads type of simulation 310A and knows that the type of simulation will be an "errSim," or an error simulation. Error simulator mechanism 125 then reads the type of data (type of simulation data 320A), which indicates, in the particular case of SCSI devices, the type of sense errors. Some standards, and thus devices for those standards, have multiple types of errors. Entries 310 and 320 in table 300 provide the necessary information to error simulation mechanism 125 so that error simulator mechanism 125 can interpret the subsequent fields (e.g., 330, 340, etc.). The subsequent fields provide the necessary information to tell error simulator mechanism 125 how to simulate the desired error and how to identify the expected response. Thus, changing entries 310 and/or 320 will provide error simulator mechanism 125 with the capability to interpret different table formats and, thereby simulate a wide variety of different errors without changing the overall thrust or implementation of the invention.

What is important about the data table is that test data architect mechanism 124 parses through error table 200 and extracts information about primitive errors 210. Using the information extracted from error table 200, test data architect mechanism 124 creates data table 300 that allows error simulator mechanism 125 to actually simulate each and every primitive error 210. There can be numerous changes to the table and yet the idea that test data architect mechanism 124 parses through error table 200 to extract information that is then used to create data table 300 that error simulator mechanism 125 then uses to test device driver 123 is still the same.

Error simulator mechanism 125 uses data table 300 to test device driver 123. Each entry in data table 300 will be a test that error simulator mechanism 125 will run. Error simulator mechanism 125 must force the primitive error 210 associated with each entry in data table 300. Those skilled in the art of device driver testing will be able to add this error-testing functionality into error simulator mechanism 125, either through a test or error API or through the use hardware simulator 190. In addition, error simulator mechanism 125 must ensure that the high level error associated with the primitive error 210 is "surfaced," e.g.—reported to the client (which then may report the error to the user). It is preferred that error simulator mechanism 125 take the place of client 122 when error simulator mechanism 125 is testing device driver 123. This may mean that error simulator mechanism 125 is physically inserted between device driver 123 and client 122, or that error simulator mechanism 125 is physically in the place of client 122, or that error simulator mechanism 125 intercepts the errors from device driver 123.

It should also be understood that data table 300 may be stored in main memory 120 or in DASD 170 as a file. Furthermore, test data architect mechanism 124 and error simulator mechanism 125 are shown in FIG. 1 as being separate, but it would be possible for both to be combined into one machine that performs both functions. However, the separate architecture is preferable because it allows the two elements (test data architect mechanism 124 and error simulator mechanism 125) to be run at different times or on completely different computers, possibly under completely different operating systems. The latter situation is shown in FIG. 1, where test data architect mechanism 124 on computer system 100 while a second copy of error simulator mechanism 125 is on computer system 195. In addition, test data architect mechanism 124 will generally be compiled and linked with device driver 123 to generate the test data.

Finally, in an alternative preferred embodiment of the present invention, test data architect mechanism 124 and/or error simulator mechanism 125 will independently translate alias to high level error 360 to the responses sent to the client by device driver 123. The responses sent to client 122 are the responses associated with recovered error type 240 or failed error type 250. The translation between the alias and the responses may happen through the use of a table that maps the two to each other or by passing the alias to a program that generates the responses. This has been previously discussed. What is important is that error simulator mechanism 125 uses the alias to derive the responses. This acts as a check to ensure that the device driver 123 code sends the correct responses to client 122.

Figure 4:
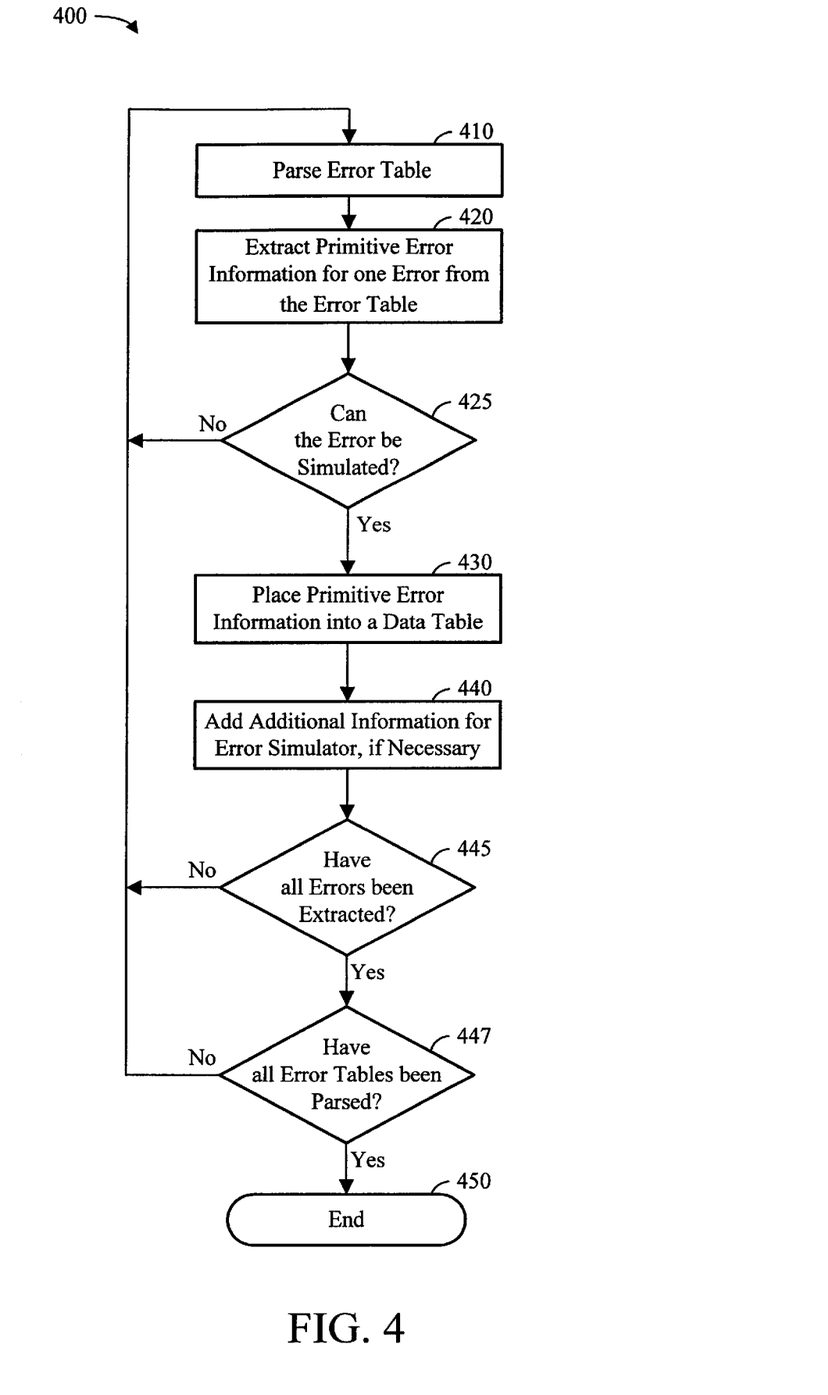
FIG. 4 is a flow diagram of a method for creating a data table in accordance with a preferred embodiment of the present invention.

Referring now to FIG. 4, a method 400 for creating a data table in accordance with a preferred embodiment of the present invention is illustrated. Data table creation method 400 starts when test data architect mechanism 124 parses through one or more error tables 200 associated with device driver 123 (step 410). Device driver 123 may have several error tables 200, and test data architect mechanism 124 must be able to parse each table. Parsing an error table 200 entails performing whatever steps are necessary to search through error table 200 for both primitive errors 210 and recovery action parameters 220. For each device driver 123, test data architect mechanism 124 must know the construction of each table (i.e., how the table stores primitive error 210, recovered error type 240, and failed error type 250), how many tables device driver 123 has, and where they are located. In order to facilitate the interaction, test data architect mechanism 124 is designed with detailed knowledge of device driver 123 and its operations and error tables. The information can be hard-coded as a part of device driver 123 or, alternatively, can be provided by the user of test data architect mechanism 124 at the time device driver 123 is to be tested.

Test data architect mechanism 124 then extracts information about primitive errors, as previously discussed in reference to FIG. 3 (step 420). It is important to note that test data architect mechanism 124 extracts each primitive error 210 and a testable result for each error. Test data architect mechanism 124 must be able to create data table 300 such that error simulator mechanism 125 can simulate primitive error 210 and know whether or not the device driver adequately performed its recovery actions associated with this primitive error 210. Generally, recovered error type 240 and/or failed error type 250, and their associated responses to client 122, will be the indicia that device driver 123 has adequately responded to primitive error 210. These indicia then will be placed into data table 300 so that error simulator mechanism 125 knows what the correct messages to client 122 should be. This has been previously discussed in reference to both FIG. 2 and FIG. 3.

Next, a test is performed to see if the primitive error 210 being extracted from error table 200 can be simulated (step 425). Primitive error 210 can usually be simulated, but in the unlikely event that primitive error 210 cannot be simulated, test data architect mechanism 124 will not create an entry in data table 300 for an error that cannot be simulated. If primitive error 210 cannot be simulated, test data architect mechanism 124 returns to parsing error table 200 to retrieve and extract the next primitive error 210. Same answer, 124 knows if an error can be simulated. In the most preferred embodiments of the present invention, test data architect mechanism 124 assumes that all errors can be simulated.

Next, using the data extracted from table 200, test data architect mechanism 124 will actually create data table 300 (step 430). As previously mentioned, data table 300 may be stored in main memory 120 or somewhere else (such as a file on DASD 170 or on a networked drive). Either contemporaneously with or after step 430, test data architect mechanism 124 will place additional information, if such additional information is needed, into data table 300 (step 440). If step 440 is not done contemporaneously with step 430, then test data architect mechanism 124 will generally leave "space" in data table 300 to add extra information for error simulator mechanism 125 into data table 300. This additional information, if used, should help error simulator mechanism 125 simulate errors and/or run diagnostics on device driver 123. The additional information will generally be of the form described in reference to FIG. 3 (e.g., type of simulation 310 and type of simulation data 320). This information will be particular to the type of device (SCSI, integrated device electronics, compact discs, etc.) and the type of simulation or diagnostics being run.

In one preferred embodiment of the invention, test data architect mechanism 124 places alias to high level error 360 in data table 300 instead of recovered error type 240 and failed error type 250 and/or their associated responses. In this embodiment, error simulator mechanism 125 will have its own way of using alias to high level error 360 to extract the associated responses and/or recovered error type 240 and failed error type 250. This acts as a check to ensure that the correct responses are sent from device driver 123 to client 122 for a particular primitive error 210.

Test data architect mechanism 124 next checks to see if all errors have been extracted from the current error table 200 (step 445). If not, test data architect mechanism 124 will return to step 410 and continue to parse error table 200 for the next primitive error 210 (step 445=NO). If all primitive errors 210 have been extracted (step 445=YES), test data architect mechanism 124 checks to see if all error tables 200 have been parsed (step 447). If not (step 447=NO), test data architect mechanism 124 selects another table to parse and begins parsing this new table (i.e., return to step 410). This process repeats as many times as necessary.

Once all necessary information has been placed into data table 300 and all error tables 200 have been parsed, test data architect mechanism 124 reaches the end of its method (step 450). Alternatively, instead of simply ending here, test data architect mechanism 124 could signal to the operating using test data architect mechanism 124 or to error simulator mechanism 125 that data table 300 is built and that simulations may be performed at any time. In addition, test data architect mechanism 124 will do other necessary steps to end the process such as closing the data table 300 file if a file is being used, deleting temporary files if they are being used, etc.

Figure 5:
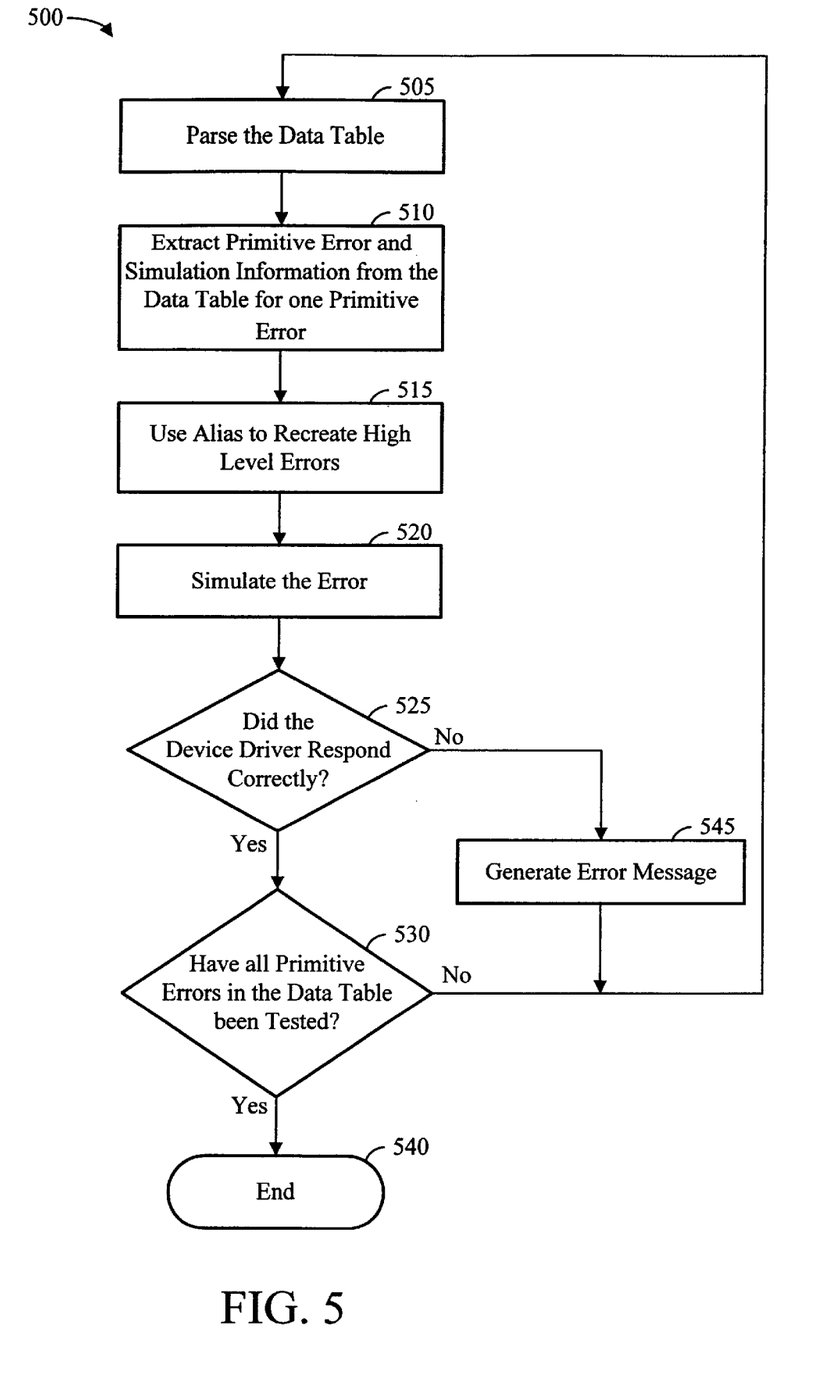
FIG. 5 is a flow diagram of a method for using the data table created by the method of FIG. 4 to test a device driver in accordance with a preferred embodiment of the present invention.

Referring now to FIG. 5, a method 500 for testing a device driver in accordance with a preferred embodiment of the present invention is illustrated. After data table 300 has been constructed as explained in FIG. 4, error simulator mechanism 125 can now begin simulating errors and checking to ensure that device driver 123 performs the correct actions for each primitive error 210. Simulation method 500 starts when error simulator mechanism 125 parses data table 300 (step 505). Naturally, error simulator mechanism 125 must know where data table 300, how to access data table 300, and how to interpret the content of table 300. As with the discussion of test data architect 124, error simulator mechanism 125 is designed to have the information regarding the location and contents of any data tables 300. This information can be supplied as a hard-coded file name which error simulator mechanism 125 can search for or, alternatively, this information can be supplied by the user at the time device driver 123 is to be tested.

As error simulator mechanism 125 parses data table 300, error simulator mechanism 125 extracts primitive error and simulation information for one primitive error 210 from data table 300 (step 510). Although partial testing of the driver may be performed, wherein only some of the primitive errors supported by device driver 123 will be tested, generally the entire set of all possible primitive errors 210 placed into data table 300 by test data architect mechanism 124 will be tested by method 500. It is important that data table 300 supply all the information necessary to enable error simulator mechanism 125 to simulate each primitive error 210, to correctly identify what the proper result of device driver 123's recovery action should be, and to ensure that the proper result is actually achieved.

In a preferred embodiment of the invention, once the information has been extracted from data table 300, error simulator mechanism 125 next uses alias to high level error 360 to recreate the responses to client 122 from device driver 123 that should occur with this particular primitive error 210 (step 515). Those skilled in the art will recognize that there are many ways of performing this step. In particular, tabular data that link the alias to the responses or to the recovered error type 240 or failed error type 250 may be used. In a second preferred embodiment, error simulator mechanism 125 passes the alias to a program that then generates the responses. These embodiments have been described in reference to FIG. 3. It is important that, by using the alias to generate the responses, error simulator mechanism 125 acts to check that device driver 123 has correctly mapped recovered error type 240 and failed error type 250 to their expected responses to client 122 for the particular primitive error 210 being tested. In a third preferred embodiment of the invention, step 515 will not be performed because recovered error type 240 and failed error type 250 and/or their expected responses are placed directly into data table 300.

Once primitive error 210 and its simulation information has been extracted and the alias converted to responses (if this step is performed), error simulator mechanism 125 simulates the primitive error 210 (step 520). The simulation of primitive errors 210 has been described previously. Error simulator mechanism 125 then checks to see if device driver 123 responded to primitive error 210 correctly (step 525). Generally, as stated in reference to FIGS. 2 and 3, each primitive error 210 will have a recovered error type 240 and/or a failed error type 250 and each of these errors will generally translate into an error response which is sent to client 122 for the primitive error 210 being tested. In most environments, a single error response may contain multiple codes. However, in general, the client will receive one response with multiple fields contained within the response. It is also possible that the format of the response may vary for different clients.

It is important to note that error simulator mechanism 125 knows what the responses to the client should be and how to perform the test so that the response or responses are actually received by the client. Furthermore, error simulator mechanism 125 will generally take the place of client 122, intercept error messages to client 122, or act as an intermediary between device driver 123 and client 122 to intercept the error messages sent by device driver 123. What is important is that error simulator mechanism 125 be able to tell what responses are sent to client 122.

If device driver 123 does not respond correctly to the primitive error 210 being tested (step 525=NO), error simulator mechanism 125 will generate an error message (step 545). This error message will generally be a particular error message such as "Device driver 123 did not respond correctly to a recoverable parity error on the SCSI bus. Device driver 123 reported that a failed parity error occurred on the SCSI bus." If device driver 123 responded correctly to the primitive error 210 being tested (step 525=YES), then error simulator mechanism 125 checks to see if all primitive errors 210 in data table 300 have been tested (step 530). If all primitive errors 210 have not been tested (step 520=NO), error simulator mechanism 125 returns to parsing data table 300 to get the next primitive error 200 and its associated simulation information (i.e., error simulator mechanism 125 returns to step 505).

After all primitive errors 210 in data table 300 have been tested by error simulator mechanism 125 (step 530=YES), error simulator mechanism 125 ends its testing (step 540). Step 540 can include various administrative functions such as having error simulator mechanism 125 generate an output file of correctly run simulations, a file of incorrectly run simulations, and, if alias to high level error 360 is being used, any primitive errors where the responses sent to client 122 by device driver 123 were not the responses expected by error simulator mechanism 125. Testing is now complete.

As demonstrated through the examples presented above, the method and apparatus of the present invention can significantly reduce the time it takes to test device drivers by creating an automated system that extracts needed information about primitive errors that a drivers supports and creates test data from this information. The automated system can then use this information to test the driver. Thus, the method and apparatus of the present invention also reduces transcription an mapping errors and provides a check for such errors.

While the present invention has been particularly shown and described with reference to preferred embodiments thereof, it will be understood by those skilled in the art that various changes in form and details may be made therein without departing from the spirit and scope of the invention.

What is claimed:

1. An apparatus comprising:
    at least one processor;
    a memory coupled to the at least one processor;
    a device driver residing in the memory;
    a test data architect mechanism residing in the memory, the test data architect mechanism extracting information from at least one error table associated with the device driver to create a data table; and an error simulator mechanism residing in the memory, the error simulator mechanism using the data table to test the device driver, the error simulator mechanism reporting the results of the driver testing to a high-level client.

2. The apparatus of claim 1 wherein the device driver is a virtual device driver and the device is a virtual device.

3. The apparatus of claim 1 wherein the at least one error table comprises a plurality of entries and wherein each of the plurality of entries provides information regarding at least one primitive error.

4. The apparatus of claim 1 wherein the at least one error table comprises a plurality of recovered error types, each recovered error type mapping to at least one response.

5. The apparatus of claim 1 wherein the at least one error table comprises a plurality of recovered error types, each recovered error type mapping to at least one response.

6. The apparatus of claim 1 wherein the error simulator mechanism tests the device driver by simulating an error.

7. The apparatus of claim 1 wherein the error simulator mechanism tests the driver through at least one software application programmer interface.

8. The apparatus of claim 1 further comprising a hardware simulator, wherein the error simulator mechanism tests the driver using the hardware simulator.

9. The apparatus of claim 1 wherein the error simulator mechanism generates an error if the device driver fails the test.

10. The apparatus of claim 1 wherein the test data architect mechanism uses each recovered error type to place an alias to a high level error in the data table.

11. The apparatus of claim 1 wherein the test data architect mechanism uses each failed error type to place an alias to a high level error in the data table.

12. A driver testing apparatus comprising:
    a first computer, the first computer comprising:
        a first processor;
        a first memory coupled to the first processor;
        a device driver residing in the first memory; and
        a test data architect mechanism residing in the first memory and extracting information from the device driver to create a data table; and
    a second computer coupled to the first computer, the second computer comprising:
        a second processor;
        a second memory coupled to the second processor; and
        an error simulator mechanism residing in the second memory and using the data table to test the device driver.

13. A method for testing a device driver, the method comprising the steps of:
    parsing at least one error table associated with the device driver;
    extracting information regarding at least one primitive error from the at least one error table;
    creating at least one data table containing at least one entry wherein the at least one entry contains information describing the at least one primitive error; and
    using the at least one entry in the at least one data table to simulate at least one error for the device driver, thereby testing the device driver.

14. The method of claim 13 further comprising the step of reporting the results of the device driver testing to a high-level client.

15. The method of claim 13 wherein the step using the data table to simulate errors for the device driver comprises the step of using the information regarding the at least one primitive error to simulate the at least one primitive error.

16. The method of claim 13 wherein the step of using the at least one entry in the at least one data table to simulate at least one error for the device driver comprises the step of using an alias in the at least one entry in the at least one data table to look up an expected response to the at least one error in an error response table.

17. A program product for testing a device driver, the program product comprising:
    a test data architect mechanism, the test data architect mechanism parsing at least one error table associated with the device driver, the test data architect creating at least one data table using the information extracted from the at least one error table;
    an error simulator mechanism, the error simulator mechanism using the data table to simulate at least one primitive device driver error, thereby testing the device driver; and
    signal bearing media bearing the test data architect mechanism and the error simulator mechanism.

18. The program product of claim 17 wherein the signal bearing media comprises transmission media.

19. The program product of claim 17 wherein the signal bearing media comprises recordable media.

* * * * *